Dec. 1, 1936. D. SHREFFLER 2,062,800
COMBINATION VEHICLE
Filed July 20, 1936 2 Sheets-Sheet 1

Inventor
Dake Shreffler
By Clarence A. O'Brien
Hyman Berman Attorney

Dec. 1, 1936.          D. SHREFFLER           2,062,800
                     COMBINATION VEHICLE
                     Filed July 20, 1936       2 Sheets-Sheet 2

Inventor
Dake Shreffler
By Clarence A O'Brien
   Hyman Berman   Attorneys

Patented Dec. 1, 1936

2,062,800

UNITED STATES PATENT OFFICE 2,062,800

COMBINATION VEHICLE

Dake Shreffler, Barnsdall, Okla.

Application July 20, 1936, Serial No. 91,573

1 Claim. (Cl. 280—87.5)

The present invention relates to new and useful improvements in vehicles particularly for children and has for one of its important objects to provide, in a manner as hereinafter set forth, a device of this character which may be used either as a coaster or a scooter.

Another very important object of the invention is to provide a vehicle of the aforementioned character which may be provided either with wheels or a runner.

Still another very important object of the invention is to provide a combination vehicle of the character described embodying novel wheel mountings.

Other objects of the invention are to provide a combination vehicle of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 4 is a detail view in side elevation of a runner which may be substituted for the wheels.

Figure 1:
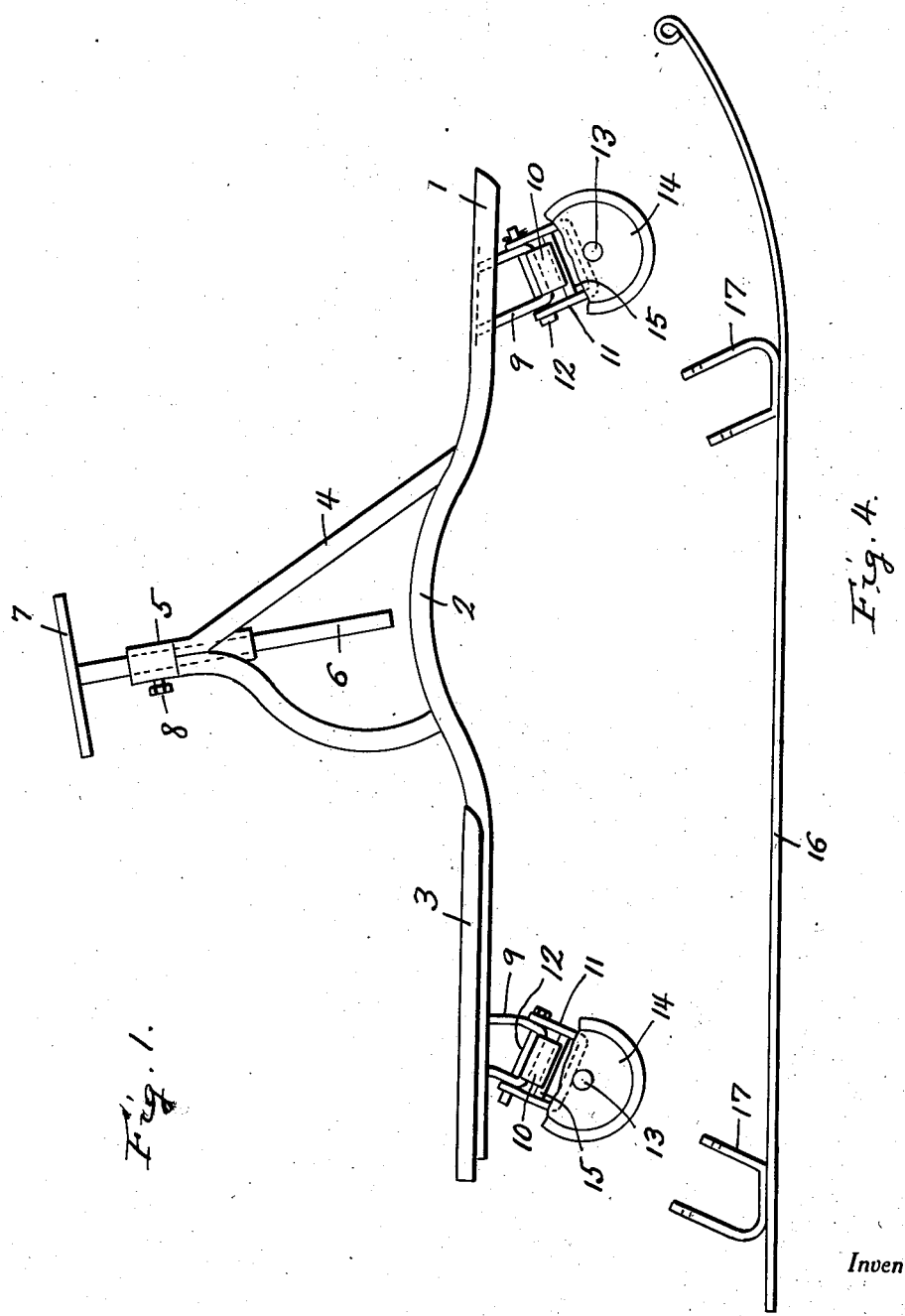
Figure 1 is a view in side elevation of the invention, the wheels being broken away to expose the wheel mountings.

Referring now to the drawings in detail, it will be seen that the embodiment of the invention which has been illustrated comprises a bar 1 of suitable length and material having a raised intermediate portion 2. Fixed on the rear portion of the bar 1 is a foot plate 3. Rising from the intermediate portion 2 of the bar 1 is a frame 4 having mounted in the top portion thereof an inclined sleeve 5. Mounted for sliding adjustment in the sleeve 5 is the stem 6 of a seat 7. A set screw 8 is provided in the sleeve 5 for securing the seat 7 in adjusted position.

Figures 2, 3:
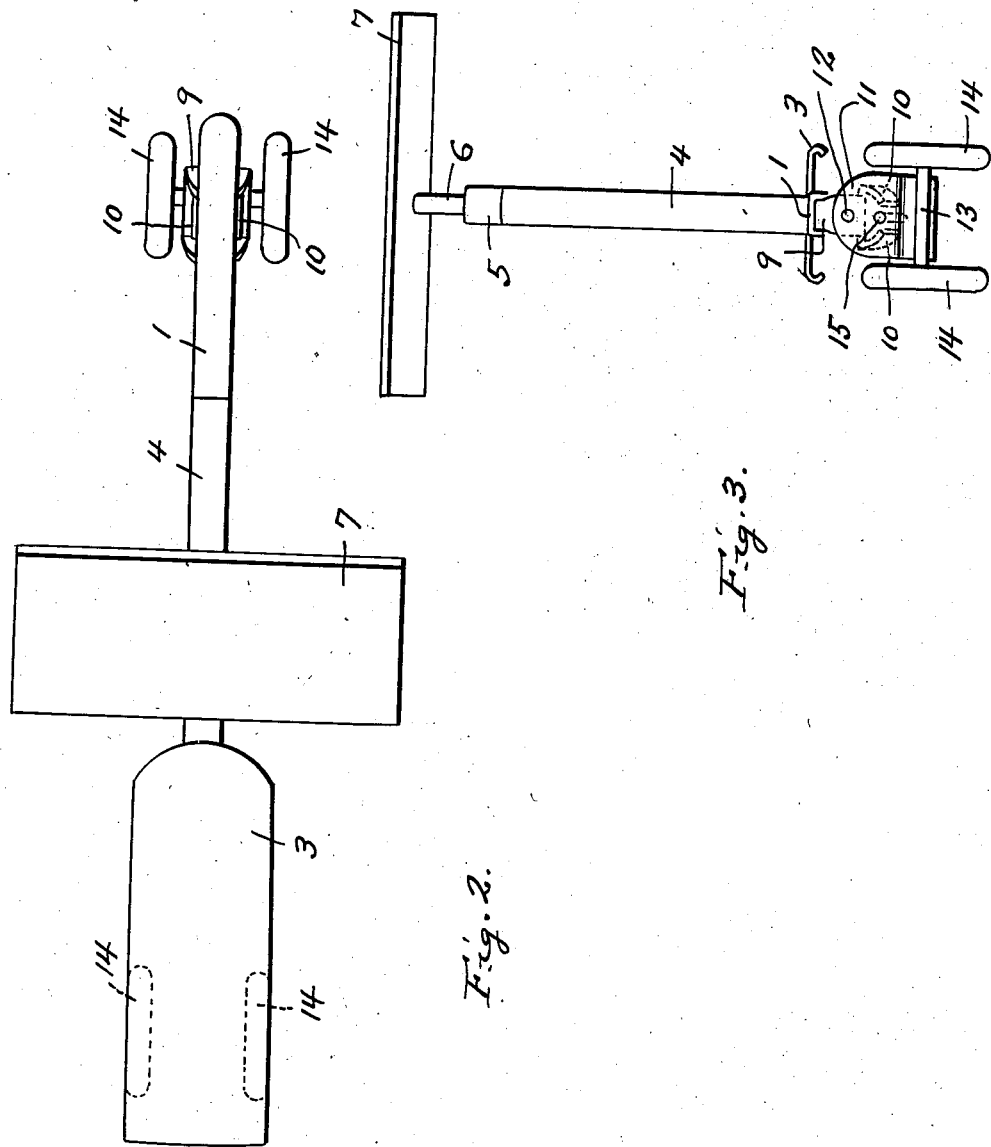
Figure 2 is a top plan view.
Figure 3 is a front elevational view.

Fixed beneath the end portions of the bar 1 are substantially U-shaped inclined brackets 9 the bight portions of which have formed integrally therewith downwardly and inwardly curved flanges 10, as best seen in Figures 1 and 3 of the drawings. The reference numeral 11 designates substantially U-shaped metallic hangers which are pivotally connected to the brackets 9 by pins 12.

Mounted transversely beneath the bight portions of the hangers 11 are axles 13 on which supporting wheels 14 are mounted. Rods 15 are mounted in the hangers 11, said rods extending between the free ends of the flanges 10 for engagement therewith in a manner to limit the swinging movement of said hangers on the brackets 9. In operation, the rider may sit on the seat 7 and coast, as when going down hill, or he may stand on one foot on the plate 3 and propel himself from the ground with the other foot, using said seat 7 as a handle. By leaning to the right or left the vehicle may be caused to turn as desired, there being sufficient looseness in the wheel mountings to permit swinging movement of the wheels. Of course, the seat 7 may be adjusted as desired by simply loosening the set screw 8. The frame 4, together with the raised intermediate portion 2 of the bar 1 materially strengthens said bar.

Referring now to Figure 4 of the drawings, the reference numeral 16 designates a runner which may be substituted for the wheels 14. The runner 16 has fixed thereon oppositely inclined, substantially U-shaped hangers 17 which may be expeditiously connected to the brackets 9 through the medium of the removable pins 12. Of course, with the runner 16 mounted in position the vehicle is to be used on snow or ice.

It is believed that the many advantages of a combination vehicle constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

A vehicle of the class described comprising a longitudinal bar, substantially U-shaped brackets mounted beneath the end portions of said bar, substantially U-shaped hangers pivotally mounted on said brackets, wheels mounted on said hangers, rods mounted in said hangers, and downwardly and inwardly extending flanges on the bight portions of the brackets engageable by the rods for limiting the swinging movement of the hangers.

DAKE SHREFFLER.